United States Patent

[11] 3,604,377

| [72] | Inventor | Merlin B. Smith<br>P.O. Box 494, West Monroe, La. 71291 |
|---|---|---|
| [21] | Appl. No. | 884,940 |
| [22] | Filed | Dec. 15, 1969 |
| [45] | Patented | Sept. 14, 1971 |

[54] SEEDLING PLANTING TOOL
7 Claims, 7 Drawing Figs.

[52] U.S. Cl. ..................................................... 111/4,
111/96, 30/286, 172/375
[51] Int. Cl. ............................................ A01g 23/02
[50] Field of Search........................................... 111/1, 4,
7.1–7.4, 92, 95–96, 99; 30/151, 124, 131, 305,
154, 162, 286, 9; 294/50.8, 50.9; 172/371, 4, 8;
47/1

[56] References Cited
UNITED STATES PATENTS

| 14,504 | 3/1856 | Jenks............................ | 111/96 |
| 323,419 | 8/1885 | Hiller ............................ | 111/4 |
| 982,575 | 1/1911 | Carpenter ..................... | 111/4 |
| 1,327,030 | 1/1920 | Gamble......................... | 111/4 |
| 2,436,500 | 2/1948 | Anderson...................... | 294/50.8 |

FOREIGN PATENTS

| 205,030 | 10/1923 | Great Britain................ | 111/4 |
| 654,562 | 12/1962 | Canada ........................ | 111/4 |
| 292,723 | 1/1932 | Italy ............................. | 111/4 |

Primary Examiner—Robert E. Bagwill
Attorneys—Clarence A. O'Brien and Harvey B. Jacobson ABSTRACT: An upstanding staff including a laterally outwardly projecting footrest above its lower end. The staff is designed to be forced down into soft ground by foot pressure applied to the foot rest with the undersurface of the foot rest limiting downward penetration of the lower end of the staff into the ground. The lower end of the staff is formed to engage the root end of a seedling disposed horizontally on the ground prior to downward penetration of the staff into the ground, whereby the staff will carry the seedling root end down into the ground as it penetrates the latter. Also, the lower end of the staff includes a shrouded vertically reciprocal cutting member which may be downwardly projected below the lower end of the staff after penetration of the latter in the ground for cutting the root end of the seedling prior to upward withdrawal of the staff from the ground.

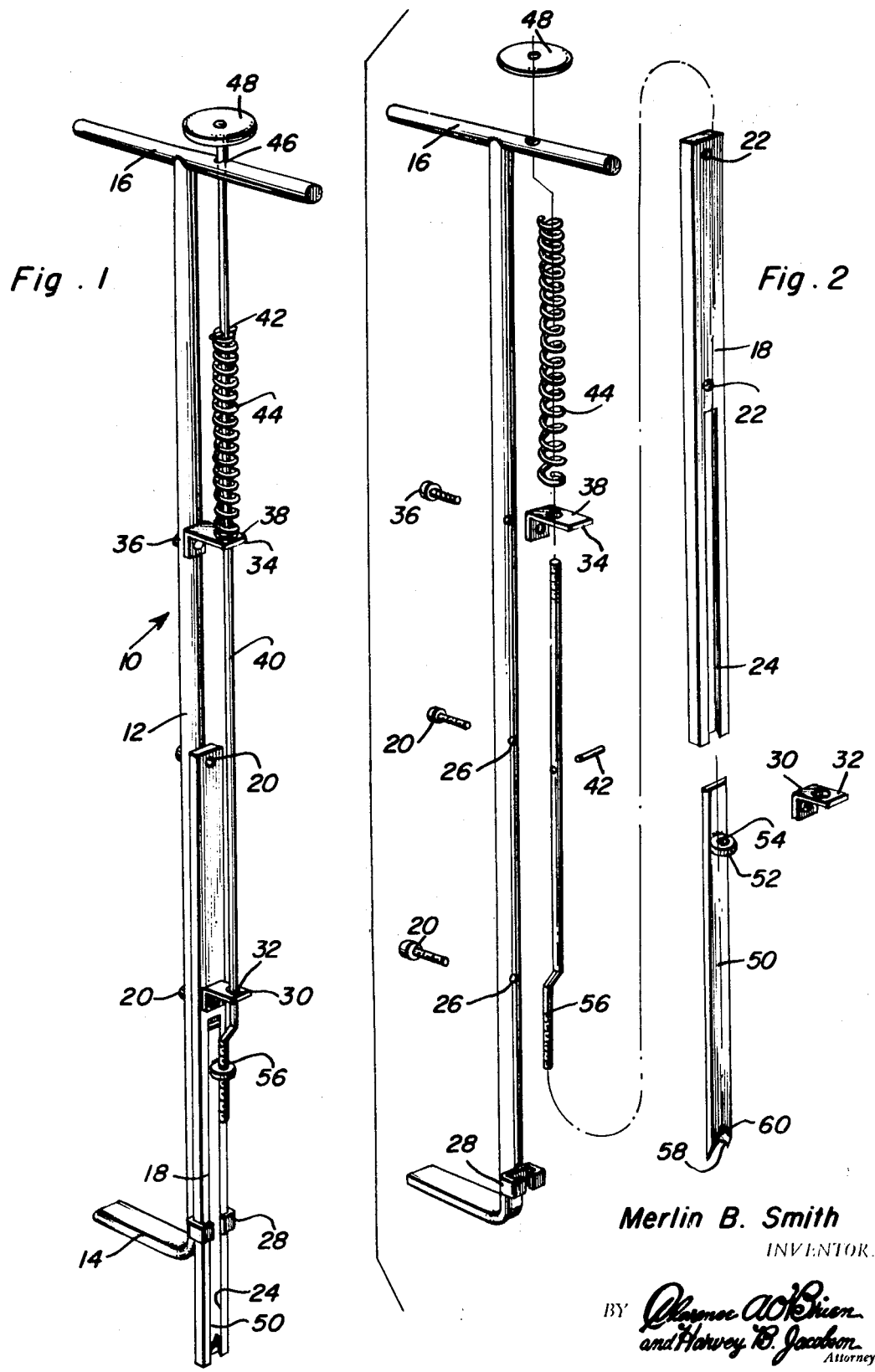

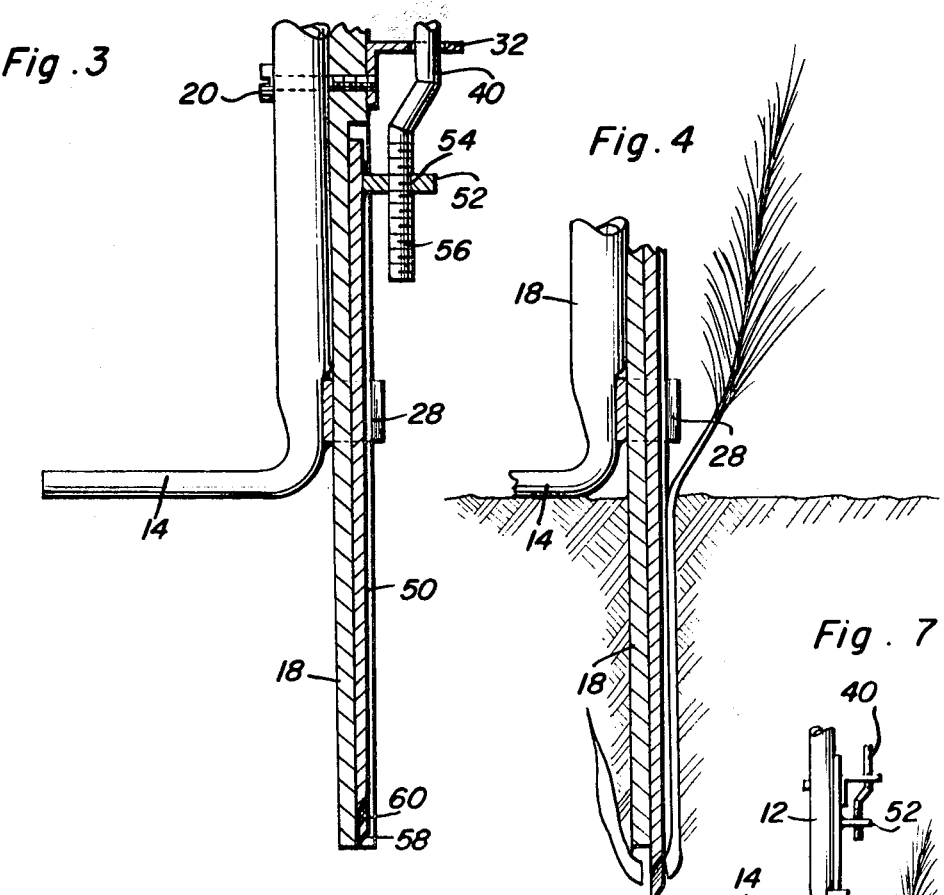

SEEDLING PLANTING TOOL

The seedling planting tool has been designed to replace the standard planting dibble which has been in use many years. The purpose of the tool is to plant more trees per day than is done with the dibble. With a dibble, a hole is dug, the tree is placed in the hole and then the hole is closed. The tool of the instant invention will not require the actual opening of the hole nor will the operator of the tool have to bend over and place the tree seedling into the hole.

The tool of the instant invention is, however, limited to operation in soft wet sites. On hard soil or rocky soil the tool of the instant invention will cut off the root end of the tree seedling before the seedling can be pulled down into the ground with the lower end of the staff portion of the tool. However, where tree seedling planting is carried out on hard ground, powered machinery specifically designed for planting tree seedlings is more efficient that the standard dibble and accordingly, when relatively large reforestation practices are being carried out on hard ground machinery specifically designed for the purpose should be used. On the other hand, on wet soft sites where powered tree seedling planting machinery cannot be operated, a handtool such as the tool of the instant invention is more efficient to use.

The tool of the instant invention is not only operable to efficiently plant tree seedlings in soft ground, but also includes structure by which the root portion of the seedling may be trimmed, as is desirable, after the seedling has been planted in the ground. Further, the tool of the instant invention may plant a single tree seedling by utilizing a substantially one-step method after the tree seedling to be planted has been laid upon the ground. The lower end of the tool is merely positioned over the root end of the seedling and depressed downwardly into the ground whereby the root end of the seedling will be carried into the ground with the lower end of the tool. After the tool has been depressed into the ground the desired depth, the root trimming or cutting operation is readily carried out by continued downward movement of a plunger reciprocally supported from the staff of the planting tool. Thus, a single downward movement of the staff portion of the tool and then continued downward movement of the cutter portion of the tool is all that is required to plant a seedling in soft ground.

The main object of this invention is to provide a seedling planting tool specifically designed to provide a means whereby tree seedlings may be more economically planted.

Another object of this invention, in accordance with the immediately preceding object, is to provide a seedling planting tool including means by which the root end of the seedling may be trimmed after the seedling has been downwardly displaced into the ground.

Yet another object of this invention is to provide a seedling planting tool of lightweight construction and which may therefore be readily handled over long periods of time in the process of planting tree seedlings without the operator of the tool experiencing excessive fatigue.

A final object of this invention to be specifically enumerated herein is to provide a seedling planting tool which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the seedling planting tool of the instant invention;

FIG. 2 is an exploded perspective view of the tool;

FIG. 3 is a fragmentary side elevational view of the lower end of the seedling planting tool with the ground penetrating staff portion thereof and cutting element thereof illustrated in vertical section;

FIG. 4 is a fragmentary elevational view similar to FIG. 3 but illustrating the manner in which a tree seedling may have the root end thereof cut therefrom after the root end of the seedling has been downwardly displaced into the ground; and FIG. 5–7 are fragmentary side elevational views of the lower portion of the seedling planting tool illustrating progressive steps followed in planting a tree seedling when using the tool.

Referring now more specifically to the drawings, the numeral 10 generally designates the seedling planting tool of the instant invention. The tool 10 defines an upright staff 12 constructed of tubular material and including a laterally directed and flattened lower end portion 14 defining a footrest. The upper end of the staff 12 is provided with a transverse handle 16 and the lower end of the staff 12 includes an extension 18 removably secured thereto by means of suitable fasteners 20. The upper end portion of the extension 18 has a pair of vertically spaced bores 22 formed therethrough and the lower end portion of the extension 18 has a dovetailed groove 24 formed therein which opens outwardly through the lower end face of the extension 18.

It may be seen that the lower end of the extension 18 projects below the footrest 14 and it is to be noted that the downward extension of the extension 18 past the footrest 14 is predetermined, depending upon the depth the seedlings are to be planted.

The lower end of the staff 12 is provided with transverse bores 26 with which the bores 22 are registrable and the fasteners 20 are secured through the bores 22 and 26.

The lower end of the staff 12 has a guide channel member 28 secured thereto through which the lower end of the extension 18 is slidingly received. Accordingly, if it is desired to adjust the amount the lower end of the extension 18 projects below the footrest 14, additional bores similar to but lower than the bores 26 may be formed in the staff 12 for securing the extension 18 at a lower position on the staff 12.

A first L-shaped support bracket 30 is supported from the extension 18 by means of the lower fastener 20 and includes an apertured horizontal flange 32 while a second L-shaped mounting bracket 34 is supported from the staff 12 above the extension 18 by means of a fastener 36. The mounting bracket 34 includes a horizontal apertured flange 38 and vertically spaced portions of an upstanding operating rod 40 are slidably received through the flanges 32 and 38. The rod 40 includes a transverse stop or abutment 42 spaced above the flange 38 and a compression spring 44 is disposed about the rod 40 between the flange 38 and the abutment 42. In addition, the upper end portion of the rod 40 projects through a vertical bore 46 formed through the handle 16 and an operating handle 48 is secured to the uppermost end of the rod 40.

A cutter bar 50 is slidably disposed in the dovetailed groove 42 and includes an outwardly projecting lug 52 which has a threaded bore 54 formed therethrough. The lower end of the rod 40 includes an offset externally threaded lower end portion 56 which is threaded through the lug 54 and accordingly, the cutter bar 50 is secured to the rod 40 for reciprocation with the latter. The lower end of the cutter bar 50 has a downwardly opening notch 58 formed therein and the edges of the cutter bar 50 defining the notch 58 are beveled as at 60 to form a sharpened edge defining the notch 58.

When the tool 10 is assembled and the cutter bar 50 is retracted upwardly into the upper end of the groove 24, the lower notched end of the cutter bar 50 is retracted upwardly relative to the lower end of the extension 18.

With attention now invited more specifically to FIG. 5–7 of the drawings, the tool 10 is utilized in planting seedlings in soft ground by first laying a seedling 64 on the ground 66 in the manner illustrated in FIG. 5 of the drawings. Then, with the rod 40 and cutter bar 50 retracted upwardly to their uppermost limit positions, the staff 12 is positioned with the lower end face of the extension 18 overlying the seedling 64 a spaced distance from the terminal end 68 of the root end of the seedling 64. Then, foot pressure may be applied to the footrest 14 to urge the extension 18 down into the ground 66 until the undersurface of the footrest 14 abuts the upper surface of the ground 66. This downward movement of the extension 18 into the ground 66 will cause the lower end portion of the seedling 66 to be pulled downwardly into the soft ground with the lower terminal end of the extension 18 until the seedling 64 and extension 18 are positioned as illustrated in FIG. 6 of the drawings. Then, the operator of the tool 10 merely presses downward on the operating handle 18 to urge the rod 40 and the cutter bar 50 downwardly whereby the lower notched end of the cutter bar 50 is extended past the lower end of the extension 18 in order to cut the root end of the seedling 64 in the manner illustrated in FIG. 4 of the drawings. Thereafter, the tool 10 is merely upwardly withdrawn from the ground 66 and the latter may be tamped about the seedling 64. Thus, it may be seen that the tool 10 may be utilized to quickly plant seedlings in soft ground and to clip or trim the root end of the seedling 64 immediately after the seedling is placed in the ground.

It will be noted that the sharply bent root portion of the seedling 64 that is forced into the ground beneath the end of the extension 18 is that portion of the seedling 64 which is trimmed from the seedling 64 upon downward extension of the cutter bar 50 relative to the lower end of the extension 18. Thus, the remaining portion of the planted seedling 64 is that portion thereof which has not been subject to the transverse pressures applied thereto during the planting of the seedling. Also, as previously hereinbefore set forth, the amount of extension of the lower end of the extension 18 below the footrest 14 may be adjusted as desired by forming additional transverse bores in the lower end of the staff 12. Of course, inasmuch as the operating rod 40 enjoys a threaded connection with the lug 52, any adjustment in the extension 18 longitudinally of the staff 12 may be compensated for by the threaded connection between the operating rod 40 and the lug 52.

It is also to be understood that the tool 10 may be constructed of any suitable materials and that only the cutter bar 50 thereof need be constructed of a material of sufficient hardness to maintain a cutting edge. Other portions of the tool 10 may be constructed of softer materials of the noncorrosive type inasmuch as the tool 10 is only to be utilized in conjunction with soft marshy soils.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An upstanding staff including upper and lower end portions, an elongated extension secured to and generally paralleling said staff and having its lower end projecting below the lower end of said staff, said extension lower end being blunt and adapted to be placed upon the root end portion of a seedling disposed on soft ground, at a point spaced from the terminal end of said root end portion, and to penetrate the soft ground and force said root end portion down into the ground upon the application of a downward thrust being applied to said staff, and a cutter member including a lower downwardly facing cutting edge supported from said extension and shiftable rectilinearly therealong between a raised inoperative position with said cutting edge retracted above said blunt lower end portion and a lowered cutting position with said cutting edge projecting below said blunt lower end portion, whereby, after said root end portion has been forced into the ground, the cutter member may be shifted from its inoperative position to its operative position to cut the terminal end of said root end portion therefrom.

2. The combination of claim 1 wherein the lower end portion of said staff includes a lateral projection whose undersurface is adapted to abut the upper surface of said soft ground to limit downward displacement of said staff, and thus said extension, relative to the soft ground.

3. The combination of claim 2 wherein said lateral extension includes a generally horizontally disposed upper surface upon which downward foot pressure may be applied.

4. The combination of claim 1 wherein said extension defines an upstanding passage opening downwardly through the lower blunt end of said extension, said cutter member comprising an elongated upstanding member upon whose lower end said cutting edge is disposed, said elongated upstanding cutter member being reciprocally disposed within said passage with at least the lower end portion thereof completely enclosed within the confines of the lower end of said extension when said cutter member is in its raised retracted position.

5. The combination of claim 4 including means operatively connected between said upstanding cutter member and said staff yieldingly biasing said cutter member toward said raised inoperative position.

6. The combination of claim 5 including an upstanding operating rod guidingly supported from said staff for rectilinear reciprocation with its upper end disposed adjacent the upper end of said staff for manual downward displacement of said rod and the lower end of said rod operably connected to said upstanding cutter member for reciprocation of the latter in response to reciprocation of the operating rod.

7. The combination of claim 6 wherein the lower end portion of said staff includes a lateral projection whose undersurface is adapted to abut the upper surface of said soft ground to limit downward displacement of said staff, and thus said extension, relative to the soft ground.